(12) United States Patent
Oami et al.

(10) Patent No.: US 8,478,050 B2
(45) Date of Patent: Jul. 2, 2013

(54) VIDEO SIGNATURE GENERATION DEVICE AND METHOD, VIDEO SIGNATURE MATCHING DEVICE AND METHOD, AND PROGRAM

(75) Inventors: Ryoma Oami, Tokyo (JP); Kota Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 541 days.

(21) Appl. No.: 12/691,073

(22) Filed: Jan. 21, 2010

(65) Prior Publication Data

US 2011/0129155 A1 Jun. 2, 2011

(30) Foreign Application Priority Data

Dec. 1, 2009 (JP) ................................ 2009-273250

(51) Int. Cl.
*G06K 9/56* (2006.01)
(52) U.S. Cl.
USPC ....................................................... 382/205
(58) Field of Classification Search
None
See application file for complete search history.

(56) References Cited

U.S. PATENT DOCUMENTS 5,528,741 A * 6/1996 Lucas .............................. 345/593
6,501,794 B1 * 12/2002 Wang et al. ............... 375/240.08
2008/0025616 A1 * 1/2008 Bryll ............................. 382/209
2009/0087116 A1 * 4/2009 Watarai ......................... 382/260
2011/0007932 A1 * 1/2011 Zhang ........................... 382/100
2011/0007974 A1 * 1/2011 Ai et al. ........................ 382/201

FOREIGN PATENT DOCUMENTS

WO PCT-CN2008-073699 * 7/2009

OTHER PUBLICATIONS

K. Iwamoto et al., "Image Signature Robust to Caption Superimposition for Video Sequence Identification", IEEE, Proceedings of International Conference on Image Processing (ICIP2006), 2006, pp. 3185-3188.
E. Kasutani et al., "Video Material Archive System for Efficient Video Edting Based on Media Identification", IEEE, Proceedings of International Conference on Multimedia and Expo (ICME2004), 2004, pp. 727-730.

* cited by examiner

*Primary Examiner* — Andrew W Johns
*Assistant Examiner* — David F Dunphy

(57) ABSTRACT

A problem of degradation in the accuracy of video matching, which is caused when videos contain video patterns commonly appearing in various videos or video patterns in which features cannot be acquired stably, is solved. In order to solve this problem, a visual feature extraction unit extracts a visual feature to be used for identification of a video based on features of a plurality of pairs of sub-regions in the video, and a confidence value calculation unit calculates a confidence value of the visual feature based on the features of the plurality of pairs of sub-regions. When matching is performed, visual features are compared with each other in consideration of the confidence value.

41 Claims, 7 Drawing Sheets

VIDEO SIGNATURE GENERATION DEVICE AND METHOD, VIDEO SIGNATURE MATCHING DEVICE AND METHOD, AND PROGRAM

INCORPORATION BY REFERENCE

This application is based upon and claims the benefit of priority from Japanese patent application No. 2009-273250, filed on Dec. 1, 2009, the disclosure of which is incorporated herein in its entirety by reference.

TECHNICAL FIELD

The present invention relates to video signature generation devices, video signature generation methods, and video signature generation programs, for retrieving videos, which are capable of detecting similar or identical moving image sections among a plurality of moving images.

BACKGROUND ART

An exemplary device for extracting features from moving images and collating them is described in "Video Signature Robust to Caption Superimposition for Video Sequence Identification" (Non-Patent Document 1). FIG. 7 is a block diagram showing the device described in Non-Patent Document 1.

A block unit feature extraction unit 1000 extracts features in block units from a first video to be input, and outputs a first feature to a matching unit 1030. Another block unit feature extraction unit 1010 extracts features in block units from a second video to be input, and outputs a second feature to the matching unit 1030. A weighting coefficient calculation unit 1020 calculates a weighting value of each of the blocks based on a learning video to be input, and outputs a weighting coefficient to the matching unit 1030. The matching unit 1030 compares the first feature output from the block unit feature extraction unit 1000 with the second feature output from the block unit feature extraction unit 1010 using the weighting coefficient output from the weighting coefficient calculation unit 1020, and outputs the matching result.

Next, operation of the device shown in FIG. 7 will be described.

In the block unit feature extraction unit 1000, each of the frames of the input first video is divided into blocks, and a feature for identifying the video is calculated from each block. Specifically, the block unit feature extraction unit 1000 determines the type of the edge for each block, and calculates the type as a feature of each block. Then, for each of the frames, the block unit feature extraction unit 1000 forms a feature vector configured of the edge types of the respective blocks. Then, the block unit feature extraction unit 1000 calculates the feature vector of each of the frames, and outputs the acquired feature to the matching unit 1030 as the first feature.

Operation of the block unit feature extraction unit 1010 is the same as that of the block unit feature extraction unit 1000. The block unit feature extraction unit 1010 calculates the second feature from the second video input, and outputs the acquired second feature to the matching unit 1030.

On the other hand, the weighting coefficient calculation unit 1020 calculates probability that a caption is inserted in each block of a frame, using a learning video beforehand. Then, based on the calculated probability, the weighting coefficient calculation unit 1020 calculates a weighting coefficient of each block. Specifically, a weighting coefficient is calculated such that weighting becomes high as the probability of a caption being superposed is low, in order to improve robustness to caption superposition. The acquired weighting coefficient is output to the matching unit 1030.

The matching unit 1030 compares the first feature output from the block unit feature extraction unit 1000 with the second feature output from the block unit feature extraction unit 1010, using the weighting coefficient output from the weighting coefficient calculation unit 1020. Specifically, the matching unit 1030 compares the features of the blocks at the same position in the two frames, and calculates a score of the block unit such that the score is 1 if they are the same, and the score is 0 if they are not the same. The matching unit 1030 sums the acquired scores of the block units by weighting them with use of the weighting coefficients, and calculates a matching score (similarity of a frame unit) of the frame. The matching unit 1030 performs these processes on the respective frames to thereby acquire a matching result between the first video and the second video.

Through these processes, it is possible to perform matching of moving images while reducing influences of caption superposition in portions where the influences may be large, and to achieve high matching accuracy even if caption superposition may be caused.

[Non-Patent Document 1] Kota Iwamoto, Eiji Kasutani, Akio Yamada, "Image Signature Robust to Caption Superimposition for Video Sequence Identification", Proceedings of International Conference on Image Processing (ICIP2006), 2006

[Non-Patent Document 2] Eiji Kasutani, Ryoma Oami, Akio Yamada, Takami Sato, and Kyoji Hirata, "Video Material Archive System for Efficient Video Editing Based on Media Identification", Proceedings of international Conference on Multimedia and Expo (ICME2004), pp. 727-730, 2004

Besides the caption superposition described above, there are also causes of lowering the matching accuracy of videos. For example, as scenes fading to black frames commonly appear in various videos, this reduces the matching accuracy of videos. Further, as features cannot be acquired stably in frames only having almost uniform values, such frames also reduce the matching accuracy of videos. As such, if similar (almost identical) video segments which may be caused even in independent videos such as a scene fading to a black frame, and video segments with low reliability in the features such as frames only having almost uniform values are compared in the same manner as other ordinary segments, excessive detection or omission of detection may be caused. This brings a problem of low matching accuracy. Such a problem cannot be solved by the art described in Non-Patent 1 which fails to consider the characteristics of videos themselves which are matching targets.

SUMMARY

An exemplary object of the present invention is to provide video signature generation devices and video signature matching devices, capable of solving a problem of low matching accuracy which is caused when videos contain video patterns commonly appearing in various videos and video patterns in which features cannot be calculated stably.

A video signature generation device according to an exemplary aspect of the present invention includes a visual feature extraction unit which extracts visual features to be used for identification of videos based on features of a plurality of pairs of sub-regions in the videos, and a confidence value calculation unit which calculates confidence values of the visual features based on the features of the plurality of pairs of sub-regions.

Further, a video signature matching device according to another exemplary aspect of the present invention includes a matching parameter calculation unit which calculates a matching parameter based on first confidence value information and second confidence value information; with use of a first visual feature to be used for video identification calculated from features of a plurality of pairs of sub-regions in a first video, the first confidence value information which is calculated from the features of the plurality of pairs of sub-regions in the first video and indicates a confidence value of the first visual feature, a second visual feature to be used for video identification calculated from features of a plurality of pairs of sub-regions in a second video, and the second confidence value information which is calculated from the features of the plurality of pairs of sub-regions in the second video and indicates a confidence value of the second visual feature; and a matching unit which compares the first visual feature with the second visual feature in accordance with the matching parameter, and outputs a matching result.

According to the present invention, it is possible to prevent deterioration in matching accuracy which may be caused by video patterns commonly appearing in various videos and video patterns in which feature amounts cannot be acquired stably.

EXEMPLARY EMBODIMENT

Next, exemplary embodiments of the present invention will be described in detail with reference to the drawings.
[Exemplary Embodiment of Video Signature Generation Device]

Figure 1:
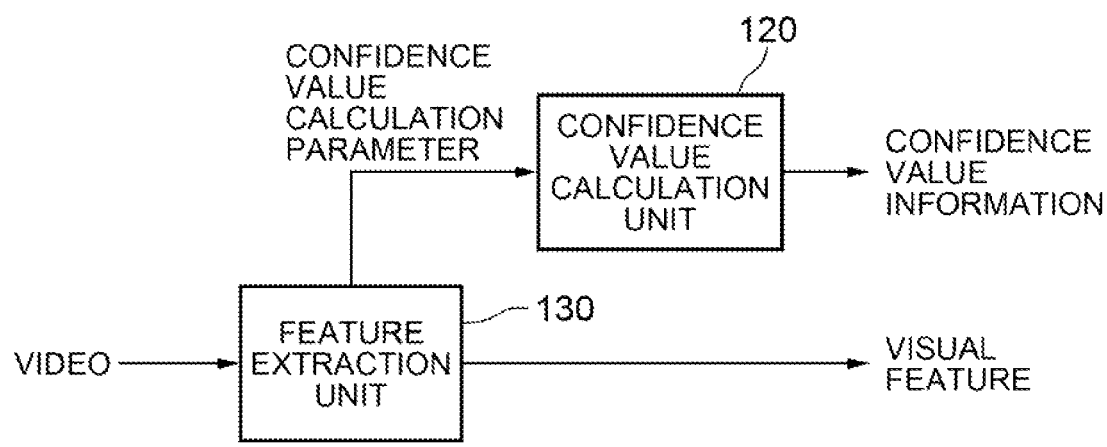
FIG. 1 is a block diagram showing an exemplary embodiment of a video signature generation device according to the present invention.

FIG. 1 shows an exemplary embodiment of a video signature generation device of the present invention, which includes a feature extraction unit 130 and a confidence value calculation unit 120.

The feature extraction unit 130 extracts features from an input video, outputs a visual feature, and also outputs a confidence value calculation parameter to the confidence value calculation unit 120. The confidence value calculation unit 120 calculates a confidence value based on the confidence value calculation parameter output from the feature extraction unit 130, and outputs confidence value information. The visual feature output from the feature extraction unit 130 and the confidence value information output from the confidence value calculation unit 120 constitute a video signature of the input video. The visual feature and the confidence value information may be independent if the corresponding relationship between them is clarified, or integrated as shown in another exemplary embodiment using a multiplexing unit, which will be described below.

Next, operation of the exemplary embodiment shown in FIG. 1 will be described in detail.

When the original video to be input to the feature extraction unit 130 is encoded, the video is first decoded by a decoder, and then the data is input in picture units.

It should be noted that a picture is a unit constituting a screen, and is usually configured of a frame or a field. However, a picture is not limited to this configuration, and may be in any form if it is a unit constituting a screen, or may be a partial video formed by cutting out a portion of a screen. For example, in the case of a video in which black bars are added, a screen without the black bars may be a picture. It should be noted that a black bar means a black extra region which may often be inserted in top and bottom or in right and left by aspect conversion between 4:3 and 16:9, for example.

The feature extraction unit 130 calculates a feature vector, which is a visual feature, for each picture. The feature extraction unit 130 considers a picture as one still image, and extracts a visual feature indicating features such as colors, patterns, shapes, and the like of this picture. For example, the feature extraction unit 130 calculates a difference between the features of two sub-regions of each of a plurality of pairs of sub-regions in the picture, calculates a quantized value of each of the pairs of sub-regions by quantizing the difference, and extracts a feature vector as a visual feature, in which the calculated quantized value of each of the pairs of sub-regions represents a value of each dimension thereof. For example, the feature extraction unit 130 calculates an average value (or an average luminance value) of pixel values (or luminance values) in each sub-region of a pair of sub-regions, and calculates a difference between the average values of the pair of the two sub-regions, and extracts a feature vector in which a quantized value acquired by quantizing the difference represents a value of each dimension thereof, as a visual feature. In this process, if a luminance value is used, it is robust even to modification processes (e.g., analog dub and high compression of videos) in which a color deviation might be caused in the image. The feature vector calculated for each picture is output as a visual feature.

The feature extraction unit 130 simultaneously calculates a confidence value calculation parameter. It should be noted that a confidence value means a value showing how much the identification result (matching result) is reliable when identification (matching) was performed using the extracted visual feature. As such, a confidence value is a measure showing the certainty of the identification result, which becomes large when the certainty of the identification result is high and becomes small when the certainty is low. The confidence value calculation parameter is a parameter to be used for calculating a confidence value of the extracted visual feature, which can take any values if it enables to calculate a confidence value in which the value thereof becomes small for an undesirable video pattern for identifying a video, that is, a video pattern in which certainty of the identification result becomes low. The parameter may be the extracted visual feature itself, or an intermediate physical amount (statistics) which can be obtained during extraction of the visual feature. Alternatively, the parameter may be the input video itself, or the one obtained by extracting a feature having correlation with a specific pattern from the input video.

Undesirable video patterns include video patterns (scenes) which appear almost identical although they are originally entirely different. Fade-out to a black frame, which is often used in a movie, is a typical example. In the case of fade-out, which is a video editing method used in various videos of different contents, the scenes become totally black (or totally white) after fade-out regardless of original contents of the videos, so that no difference is found between videos. As such, the undesirable video patterns mean common video patterns generated in a plurality of videos of entirely different contents. This kind of video pattern brings a problem in identification regardless of the type of the feature to be used.

On the other hand, there is also an undesirable video pattern which changes depending on the type of feature. Specifically, there is a case where the feature becomes unstable and loses robustness. For example, a video having small features, such as a scene configured of flat images where undulation of pixel values on the screen is small, is easily affected by noise or the like depending on the type of the feature so that the robustness is deteriorated. Although the type of a video in which robustness would degrade depends on the feature, there is a video pattern in which robustness inherent to the feature degrades, regardless of the type of the feature. For example, regarding a feature related to colors, robustness degrades when the scene becomes black and white. On the other hand, regarding a feature indicating patterns, robustness degrades when the scene becomes a flat image, as described above.

In order to prevent adverse effects on matching due to a visual feature extracted from a specific video pattern which is undesirable for video identification, the confidence value calculation unit 120 calculates a confidence value. This means that the confidence value calculation unit 120 calculates a confidence value such that a confidence value becomes low if a picture from which a visual feature is extracted corresponds to a particular video pattern. Although a method of calculating a confidence value depends on the video pattern, in the case of a fade-out scene described above for example, a confidence value can be calculated by using a value reflecting flatness of the luminance value of the entire image. As such, a value having correlation with flatness of the luminance value is used as a confidence value calculation parameter, and the confidence value is defined such that the value becomes small when the value of the confidence value calculation parameter shows that flatness of the luminance value of the entire screen is high. It is also possible to measure temporal changes in the confidence value calculation parameter and to determine fade-out based on the changes. For example, a value correlated with flatness of the luminance value in the screen is used as a confidence value calculation parameter, and if it can be estimated by the confidence value calculation parameter that the flatness of the screen gradually becomes higher and the entire screen finally becomes flat, a confidence value may be calculated by considering the history of temporal changes of the confidence value calculation parameter.

The confidence value calculation is performed on each picture, and a confidence value is output for each picture. It is also acceptable to comprehensively calculate a confidence value for pictures of a certain cycle, and output it.

As described above, in this exemplary embodiment, as a confidence value is generated together with the feature such that a confidence value of a picture corresponding to a video pattern undesirable for video identification becomes low, by using this confidence value at the time of matching, the matching accuracy can be improved. Further, as it is possible to adopt a confidence value calculation method suitable for each predetermined video pattern, the matching accuracy in the entire video can also be improved.

[Another Exemplary Embodiment of Video Signature Generation Device]

Next, another exemplary embodiment of a video signature generation device of the present invention will be described. In the below description, a pattern in which the luminance of the video is uniform across the screen (flat video) is considered as a particular undesirable video pattern, and a method of calculating a confidence value will be described in the case of using a feature described below. As such, a calculation method, with which a confidence value becomes low when a pattern in which luminance of the video becomes uniform across the screen (flat video), will be described.

Figure 2:
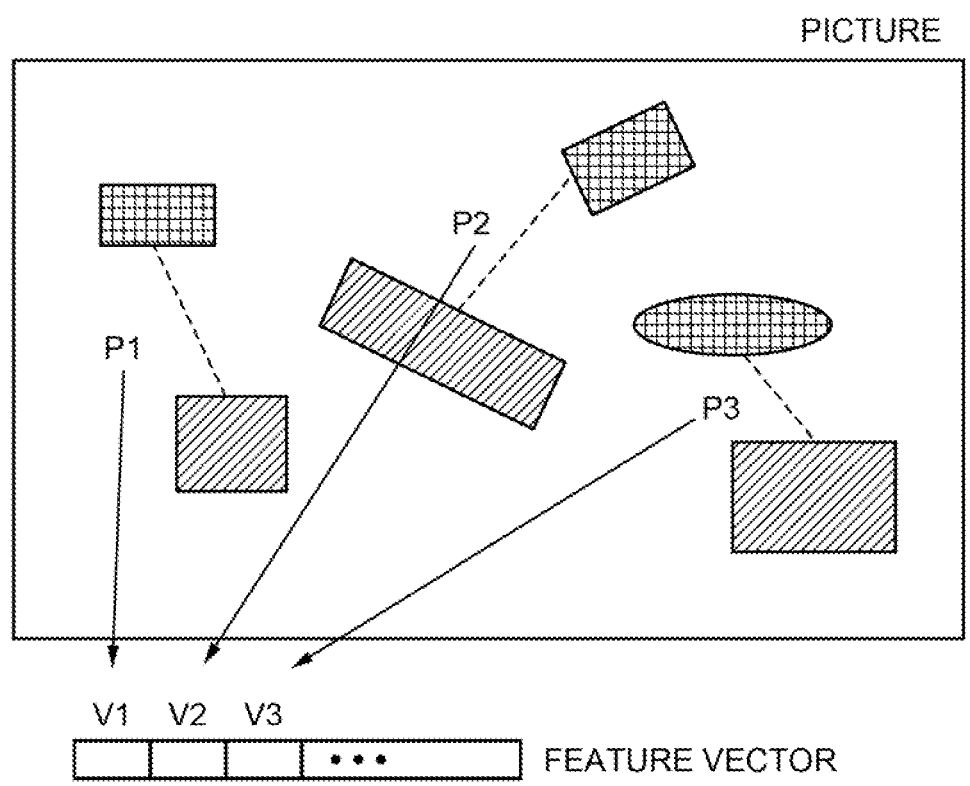
FIG. 2 shows an exemplary method of extracting features from a picture.

FIG. 2 shows an exemplary method of extracting features from a picture. In this method, a plurality of pairs of regions (two sub-regions) within a picture are set beforehand, a difference between the features of the two sub-regions of a pair is calculated, and a feature vector is acquired based on the differences. In this embodiment, respective pairs of regions are indicated as P1, P2, ... PN, and a feature defined from the $n^{th}$ pair Pn is indicated as Vn. Pairs of regions may take various combinations of shapes and positions of regions. Preferably, in at least one of a plurality of pairs of regions, a combination of the shapes of the two regions of the pair and a combination of relative positions of the two regions of the pair differ from those of all other two sub-regions constituting the pairs. Further, regarding pairs of two regions in which both combinations of the shapes of the two regions and relative position between the two regions are the same, the absolute positions of the pairs differ.

Also, various methods can be used for calculating a feature value Vn from a pair Pn. For example, there is a method in which an average value of luminance is calculated in each of a shaded region and a reticulated region of a pair, and a value of the feature value Vn is determined from the magnitude relation. Specifically, an average luminance value obtained within a reticulated region is subtracted from an average luminance value obtained within a shaded region to calculate a difference Dn, and the feature value Vn is calculated by quantizing the difference Dn to any one of three values of $-1$, 0, and $+1$ such that, if a threshold is indicated as Th, when Dn>Th, Vn=1, when Dn<−Th, Vn=−1, and in other cases, Vn is zero (which means when Abs(Dn)≦Th, Vn is zero, where Abs( ) is a function for calculating an absolute value).

The value of the difference value Dn, which is calculated when calculating the feature value Vn, generally becomes close to zero if the luminance of the entire screen becomes uniform (flat). This means that distributions of the difference value Dn concentrate on values close to zero (become smaller values or zero). As the difference value Dn accurately reflects the characteristics of the flat image, this value is suitable as a measure for calculating a confidence value. As such, a value evaluating this degree can be used as a confidence value. For example, a statistical value is calculated based on distributions of the difference values Dn or absolute values (Abs(Dn)) of the difference values Dn, and a confidence value can be determined according to the magnitude of the statistical value. As statistical values, an average value, a median value, and a mode value which are values representing the distributions (representative values), a maximum value and a minimum value, and a percentile (a value that a cumulated frequency reaches a certain percent of the entire distribution), variance, and an $n^{th}$ moment may be used. For example, variance of the difference values is calculated, and this value or a value having positive correlation with this value (standard deviation or a value defined by a monotone increasing function relating to variance) can be used as a confidence value. Alternatively, a representative value of distributions may be used for calculating a confidence value. As a representative value well reflects the features of the entire distributions, the value is a measure suitable for representing the feature of the distributions in one value, and a confidence value can be determined using this value. For example, an average value of distributions of absolute values Abs(Dn) of the difference values Dn may be calculated as a representative value, and used as a confidence value. Alternatively, a median value of the absolute values Abs(Dn) of the difference values Dn may be calculated and used as a confidence value. When using a median value, even when a region which does not originally exist in the screen is added by the modification of caption superposition or black bar insertion, the confidence value can be calculated by eliminating such a region as outlier, so that the robustness can be improved. Further, assuming that absolute values Abs(Dn) of the difference values Dn sorted in an ascending order are dk={d1, d2, . . . dN}, an absolute difference dK when k=K may be selected as a representative value, and the confidence value can be calculated. If K=floor(0.5*N) is used as K, the absolute difference dK is a median value of the absolute values Abs(Dn). It should be noted that floor( ) is a function of truncating after the decimal point. Further, K=floor($\alpha$*N) may be used as K (where $0 \leq \alpha \leq 1$). Even in this case, the effects similar to those obtained by using the median value can be achieved.

When expressing a confidence value in one byte, that is, when the range of the confidence value is set from 0 to 255, the confidence value is calculated by min(floor (dK*$\beta$), 255), using this absolute difference dK. It should be noted that min( ) is a function of returning a minimum value, and $\beta$ is a coefficient for adjusting the value of a confidence value, in which $\beta$=8, for example. As such, a confidence value can be calculated by min(floor (dK*8), 255). Basically, as the value of a confidence value is important when it becomes lower, by multiplying the constant $\beta$ to enlarge the value when the confidence value is low, it is possible to precisely control identification process in accordance with the confidence value. On the other hand, when the confidence value is high, as the visual feature itself has sufficient identification property, precise control of identification process is not necessary. In that case, by cutting the upper limit of the range at 255, the confidence value can be described in one byte, so that the size of a video signature can become compact. Further, as the confidence value is in one byte, delimiters of video signatures can be aligned in byte units, so that processing in bit units is not necessary any more. As such, data readout at the time of identification can be performed at a higher speed.

With this configuration, a small confidence value is generated for a video having uniform luminance (flat image).

[Exemplary Embodiment of Video Signature Matching Device]

Next, an exemplary embodiment of a matching device for video signatures, generated by the video signature generation device of FIG. 1, will be described.

Figure 3:
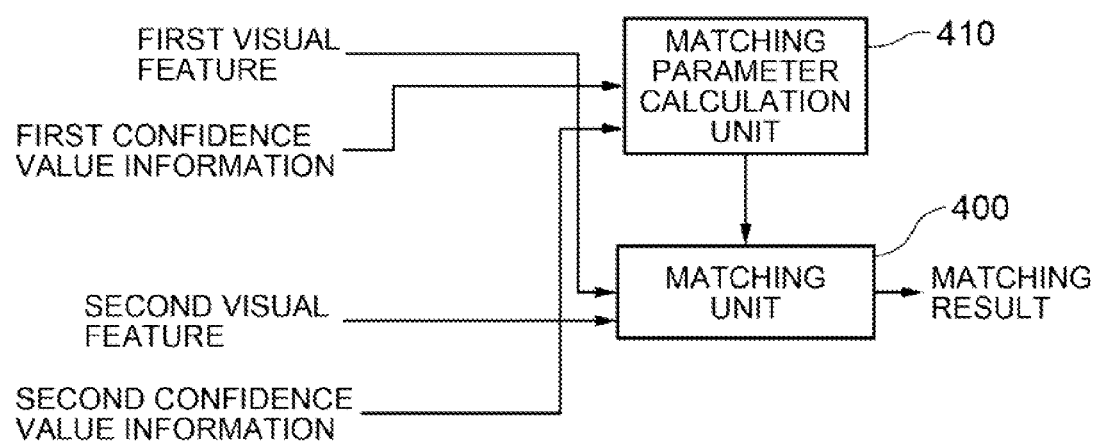
FIG. 3 is a block diagram showing an exemplary embodiment of a video signature matching device according to the present invention.

FIG. 3 shows an exemplary embodiment of a video signature matching device for comparing video signatures generated by the video signature generation device shown in FIG. 1. The video signature matching device includes a matching parameter calculation unit 410 and a matching unit 400.

The matching parameter calculation unit 410 acquires a matching parameter from first confidence value information and second confidence value information, and outputs the matching parameter to the matching unit 400. The matching unit 400 uses the matching parameter output from the matching parameter calculation unit 410 to compare a first visual feature with a second visual feature, and outputs the matching result. It should be noted that the first visual feature and the first confidence value information constitute a video signature of a first video, and the second visual feature and the second confidence value information constitute a video signature of a second video. Further, the visual features and the confidence value information are given in picture units. Thereby, matching can be preformed for each picture.

Next, operation of the video signature matching device shown in FIG. 3 will be described.

First, the first confidence value information acquired from the first video and the second confidence value information acquired from the second video are input to the matching parameter calculation unit 410. The matching parameter calculation unit 410 calculates a matching parameter to be used for matching between the segments of the first video and the second video, from the first confidence value information and the second confidence value information. For example, from the first confidence value information and the second confidence value information, a weighting coefficient used for performing comparison on each picture is calculated as a matching parameter.

Although there may be a plurality of methods of calculating a weighting coefficient from the first confidence value information and the second confidence value information, any method can be used if a condition that the weighting coefficient becomes small when either one of the confidence values corresponds to a small value is satisfied, and if the weighting coefficient increases when both weighting values corresponding to the confidence value information increase. For example, if a confidence value of the $k_1^{th}$ picture of the first video and a confidence value of the $k_2^{th}$ picture of the second video, acquired from the first confidence value information and the second confidence value information, are respectively $r_1(k_1)$ and $r_2(k_2)$, a weighting coefficient $w(k_1, k_2)$ to be used for performing comparison between those pictures can be calculated by Expression 1.

$$w(k_1,k_2)=\min(r_1(k_1),r_2(k_2)) \quad \text{[Expression 1]}$$

The matching unit 400 compares the first visual feature with the second visual feature. They may be compared using the degree of similarity indicating similarity of the both features, or using a distance indicating the level of difference between the both features. In the case of comparing them using a distance, comparison will be performed based on a distance d calculated by Expression 2.

$$d = \sum_{i=1}^{N} |v_1(i) - v_2(i)| \quad \text{[Expression 2]}$$

It should be noted that N represents the number of dimensions of the feature, and $v_1(i)$ and $v_2(i)$ respectively represents values of the $i^{th}$ dimension of the first and second features. The comparison is performed in picture units, and specific segments of the first video and the second video are compared. In this process, the weighting coefficient $w(k_1, k_2)$ is used. For example, in the case of performing comparison between video segments with use of values that are calculated by averaging distance values of picture unit comparison within the video segments, when calculating the average value, a distance value $d(k_1, k_2)$ calculated from comparison between the $k_1^{th}$ picture of the first video and the $k_2^{th}$ picture of the second video is weighted with the weighting coefficient $w(k_1, k_2)$. As such, when comparing the segment consisting of K pictures beginning from the $t_1^{th}$ picture of the first video with the segment consisting of K pictures beginning from the $t_2^{th}$ picture of the second video, a distance value is calculated by Expression 3.

$$D = \frac{\sum_{k=0}^{K-1} w(t_1 + k, t_2 + k)d(t_1 + k, t_2 + k)}{\sum_{k=0}^{K-1} w(t_1 + k, t_2 + k)} \quad \text{[Expression 3]}$$

If this value is larger than a threshold, it is determined that the segments are not identical to each other, and if this value is a threshold or smaller, it is determined that the segments are identical to each other. By performing this process on combinations of any segments of the first video and the second video, all of the identical segments having any length included in the first video and the second video can be determined.

Alternatively, it is also possible to acquire the number of pairs of pictures in which the distance values are equal to or smaller than a threshold by performing comparison in picture units, and if the number is significantly large compared with the number of pictures included in the segments, the segments are determined to be identical, and if not, the segments are determined not to be identical. Even in this case, determination can be performed by weighting in the same manner. As such, it is also possible to perform determination by Expression 4.

$$n = \frac{\sum_{k=0}^{K-1} w(t_1+k, t_2+k) U(Th - d(t_1+k, t_2+k))}{\sum_{k=0}^{K-1} w(t_1+k, t_2+k)}$$ [Expression 4]

U(x) represents a unit step function which results in 1 when x≧0 and results in 0 when x<0, and Th represents a threshold of a distance between features of the pictures (that is, if the distance is equal to or smaller than Th, the segments are determined to be identical, and if not, the segments are determined not to be identical). By performing this process on combinations of any segments of the first video and the second video, all of the identical segments having any length included in the first video and the second video can be determined.

Figure 4:
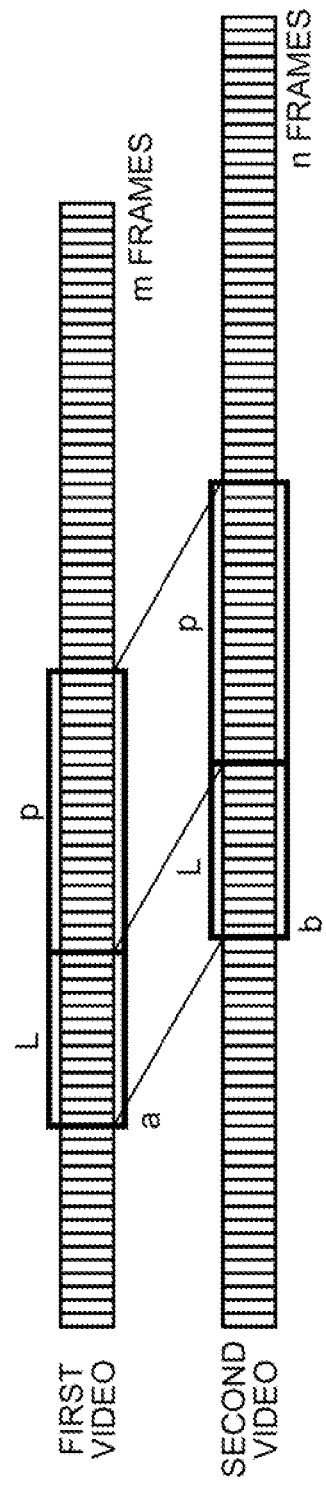
FIG. 4 is a diagram for illustrating a matching process of two videos.

As a method of comparing segments of any length, the matching method described in Non-Patent Document 2 can also be used. As shown in FIG. 4, for matching between videos, a matching window having a length of L pictures is provided, and the window is caused to slide on the first video and the second video respectively, and the both are compared. If the segments within the matching windows are determined to be identical, the matching window is extended by a length of p pictures so as to continue the matching process. As long as the both segments are determined to be identical, the process of extending the matching window by p pictures is repeated so as to obtain the identical segments with the maximum length. Thereby, the identical segments with the maximum length can be acquired effectively.

It should be noted that although the case of using a distance as a measure has been described above, comparison can also be performed using the degree of similarity. In that case, comparison is specifically performed using a degree of similarity S calculated by Expression 5.

$$S = \sum_{i=1}^{N} Sim(v_1(i), v_2(i))$$ [Expression 5]

Sim(x, y) is a function showing similarity between x and y, and the value becomes larger as the values of x and y are more similar. For example, if the distance between x and y is d(x, y), a function shown as Expression 6 can be used.

$$Sim(x, y) = \frac{1}{1 + d(x, y)}$$ [Expression 6]

Alternatively, Sim(x, y) may be a function that returns 1 when x and y match, and returns 0 otherwise, as Kronecker delta. Alternatively, if an angle (cosine value) between feature vectors is used as a degree of similarity, comparison is performed based on the degree of similarity S calculated by Expression 7.

$$S = \frac{\sum_{i=1}^{N} v_1(i) v_2(i)}{\left(\sqrt{\sum_{i=1}^{N} v_1(i)^2}\right)\left(\sqrt{\sum_{i=1}^{N} v_2(i)^2}\right)}$$ [Expression 7]

Thereby, a matching result between the first video signature and the second video signature is obtained.

Further, a matching parameter to be output from the matching parameter calculation unit 410 may be a specific parameter for determining whether or not to disregard the matching result of the corresponding pictures. If one of the pictures to be compared has low confidence value (for example, if the confidence value is lower than a predetermined certain threshold), the matching result between the pictures is not highly reliable. In that case, matching between videos may be performed without using the matching result of the pictures. For example, when comparing a video 1 with a video 2, if the fifth to ninth pictures of the video 1 have low confidence value, comparison between the video sections of the video 1 and the video 2 will be performed without using the matching results between the pictures of the fifth to ninth pictures of the video 1. Although the case where one of the videos has low confidence value has been described in above example, it is also acceptable not to use matching results of corresponding pictures only when the confidence value is low in both videos.

Alternatively, a matching parameter to be output from the matching parameter calculation unit 410 may be a specific parameter which defines that corresponding pictures do not match any other pictures. If one of the pictures to be compared has low confidence value (for example, if the confidence value is lower than a predetermined certain threshold), the matching result between the pictures is not highly reliable. In that case, the picture may be considered that it does not match any other picture. For example, when comparing the video 1 with the video 2, if the fifth to ninth pictures of the video 1 have low confidence values, comparison is performed between the video 1 and the video 2 by taking into account that all matching results between the pictures of the fifth to ninth pictures in the video 1 do not match. Although the case where one of the videos has a low confidence value has been described in the above example, it is also acceptable not to use matching results of corresponding pictures only when confidence values are low in both videos.

Alternatively, a matching parameter to be output from the matching parameter calculation unit 410 may be a parameter for describing the number of times that the pictures are determined to be different in the matching process performed between the pictures. In a modification such as analog capture, not all of the pictures are accurately captured and some pictures may be lost. In that case, comparison may not be performed well due to the lost pictures, although they are the identical videos. For that case, the number of matching failures that is allowed in matching of the pictures is decided beforehand, and if the actual number is smaller than the decided number, matching will be continued (this means that matching is terminated only when the number of failures in matching exceeds the decided number), whereby continuous segments can be compared successfully. The allowable number (Nth) of failures in matching between pictures is controlled by the confidence value. For example, in the segments of low confidence values, the value of Nth is incremented in accordance with the number of pictures of low confidence values included in the segments. In this way, even if pictures with low confidence values continue, they can be compared as continuous segments.

While the exemplary embodiments of the present invention have been described, the present invention is not limited to these embodiments, and various additions and modifications thereto may be made.

Figure 5:
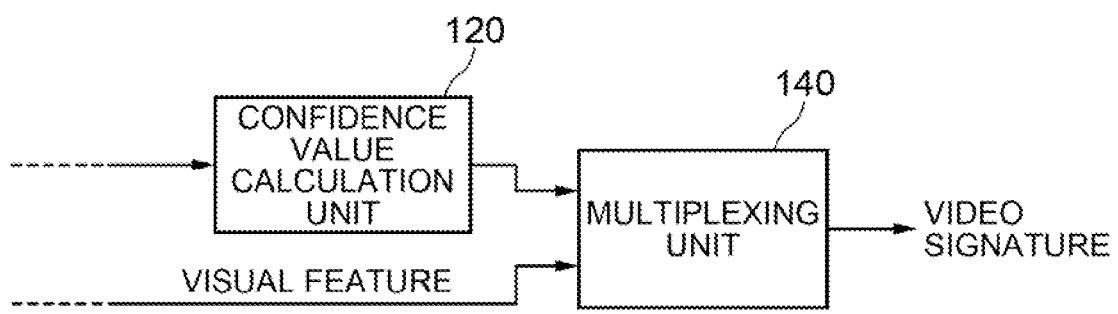
FIG. 5 is a block diagram showing another exemplary embodiment of a video signature generation device according to the present invention.

Further, the video signature generation device of the present invention may include a multiplexing unit 140, to which a visual feature output from the feature extraction unit 130 and confidence value information output from the confidence value calculation unit 120 are input, and which outputs a video signature as shown in FIG. 5. The multiplexing unit 140 generates the video signature by multiplexing the visual feature output from the feature extraction unit 130 and the confidence value information output from the confidence value calculation unit 120, and outputs the generated video signature. In this exemplary embodiment, the multiplexing unit 140 generates the video signature by multiplexing them in a separable form when being compared. Multiplexing may be performed by various methods, including, a method in which a visual feature and confidence value information are interleaved by each picture, a method in which every confidence value information is first multiplexed and then visual features are multiplexed (or vice versa), and a method in which confidence value information and a visual feature are multiplexed for each predetermined section (e.g., by each time section unit of calculating confidence value information).

Figure 6:
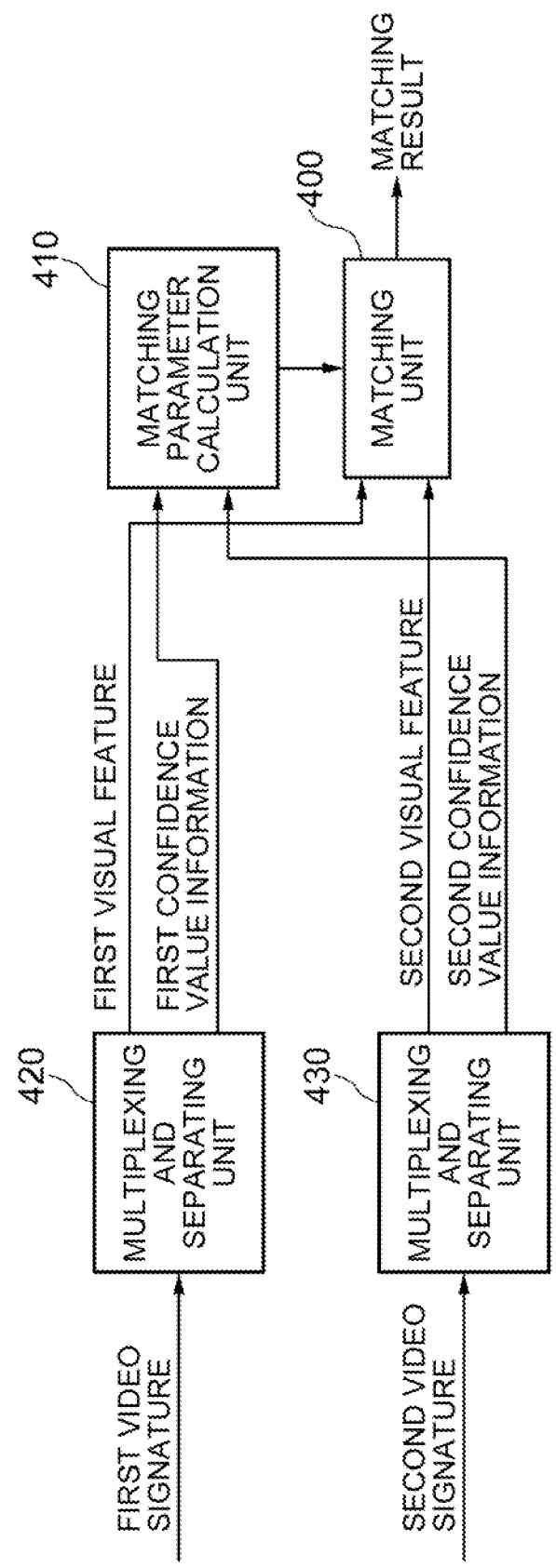
FIG. 6 is a block diagram showing another exemplary embodiment of a video signature matching device according to the present invention.
Figure 7:
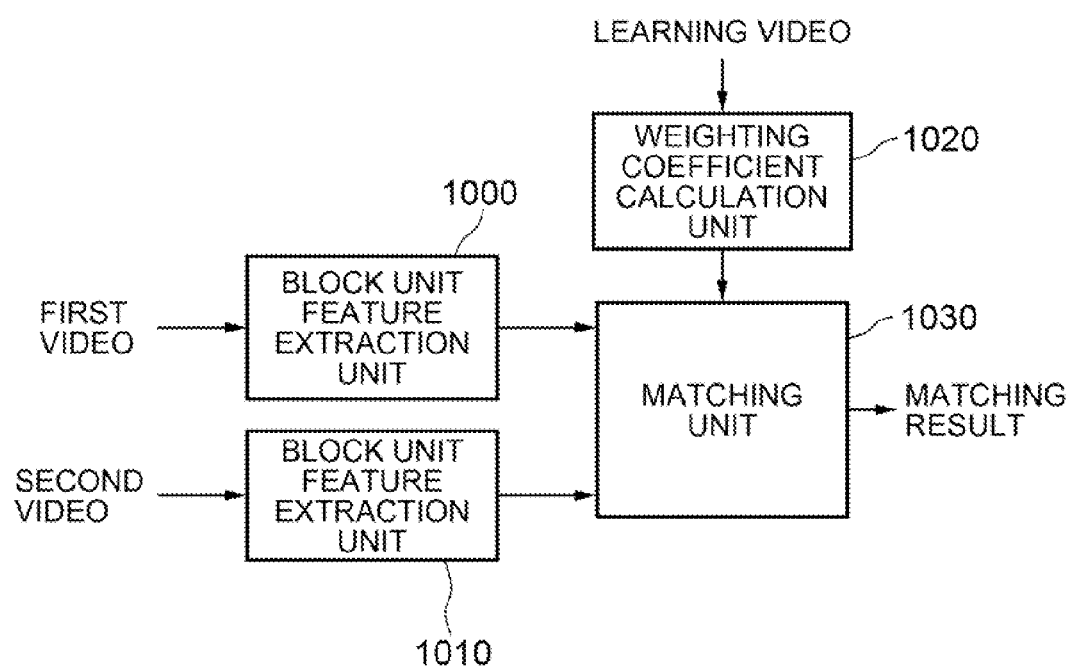
FIG. 7 is a block diagram for illustrating related art of the present invention.

Further, as shown in FIG. 6, the video signature matching device of the present invention may include multiplexing and separating units 420 and 430, to which video signatures of two images to be compared are input, and which output visual features and confidence value information constituting the video signatures. The multiplexing and separating unit 420 separates a first visual feature and first confidence value information from a first video signature input thereto, and outputs them to the matching unit 400 and to the matching parameter calculation unit 410, respectively. Similarly, the multiplexing and separating unit 430 separates a second visual feature and second confidence value information from a second video signature input thereto, and outputs them to the matching unit 400 and to the matching parameter calculation unit 410, respectively.

Further, regarding the video signature generation device and the video signature matching device of the present invention, the functions thereof can be realized by computers and programs, as well as hardware. Such a program is provided in the form of being written on a computer readable recording medium such as a magnetic disk, a semiconductor memory, or the like, is read when the computer is started for example, and controls operation of the computer, to thereby allow the computer to function as a video signature generation device or a video signature matching device of the above-described exemplary embodiments.

While the present invention has been particularly shown and described with reference to the exemplary embodiments thereof, the present invention is not limited to these embodiments. It will be understood by those of ordinary skill in the art that various changes in form and details may be made therein without departing from the spirit and scope of the present invention as defined by the claims.

The present invention is applicable to retrieval of similar or identical videos from various moving images with high accuracy. In particular, regarding retrieval of the same sections of videos, the present invention is applicable to identification of illegally copied moving images distributed on the networks and identification of commercials distributed on actual airwaves.

What is claimed is:

1. A video signature generation device, for identifying duplicate video content, comprising:
 a processor that controls the video signature generation device to implement:
  a visual feature extraction unit which extracts a visual feature of a video based on features of two sub-regions in a single frame in the video; and
  a confidence value calculation unit which calculates a confidence value of the visual feature based on the features of the two of sub-regions in the single frame, wherein the confidence value calculation unit calculates the confidence value based on a difference between the two sub-regions in the single frame.

2. The video signature generation device according to claim 1, wherein the confidence value indicates a reliability of a result of determining whether the video is substantial duplicate of another video based on the visual feature.

3. The video signature generation device according to claim 2, wherein the confidence value is low when the reliability of the result is low and the confidence value is high when the reliability of the result is high.

4. The video signature generation device according to claim 1, wherein the confidence value is low when a pattern of the video is a predetermined pattern.

5. The video signature generation device, according to claim 4, wherein the predetermined pattern is a flat image.

6. The video signature generation device, according to claim 4, wherein the predetermined pattern is an image pattern where there is little or no difference between the features of the two sub-regions.

7. The video signature generation device according to claim 1, wherein the confidence value calculation unit calculates the confidence value based on an absolute difference between the two sub-regions in the single frame.

8. The video signature generation device according to claim 1, wherein the confidence value calculation unit calculates the confidence value based on a median value of the absolute difference between the two sub-regions in the single frame.

9. The video signature generation device according to claim 1, wherein the visual feature extraction unit calculates the difference between the two sub-regions based on a difference between the features of the two sub-regions in the single frame, and
 wherein the confidence value calculation unit calculates the confidence value based on a statistical value of the difference between the two sub-regions.

10. The video signature generation device according to claim 1, wherein the visual feature extraction unit calculates the difference between the two sub-regions of the visual feature based on a difference between the features of the two sub-regions in the single frame, the two sub-regions associated with the dimension, and
 wherein the confidence value calculation unit calculates the confidence value based on a representative value of absolute values of the difference between two the sub-regions.

11. The video signature generation device according to claim 10, wherein the confidence value calculation unit calculates the confidence value based on a median value of absolute values of the value of each dimension.

12. The video signature generation device according to claim 10, wherein the confidence value calculation unit acquires, as the confidence value, a smaller value of a predetermined maximum value and a value that is obtained by multiplying the representative value by a predetermined constant.

13. The video signature generation device according to claim 12, wherein the constant is 8.

14. The video signature generation device according to claim 12, wherein the maximum value is 255.

15. The video signature generation device according to claim 1, wherein the visual feature extraction unit quantizes a difference of the features of the two sub-regions in the single frame, and extracts the visual feature based on the quantized difference.

16. The video signature generation device according to claim 10, wherein the confidence value calculation unit acquires, as the confidence value, a smaller value of a predetermined maximum value and a value that is obtained by multiplying the representative value by a predetermined constant and truncating after the decimal point.

17. The video signature generation device according to claim 1, wherein extraction of the visual feature and calculation of the confidence value are performed for each picture.

18. The video signature generation device according to claim 17, wherein the picture is a frame.

19. The video signature generation device according to claim 1, wherein the video signature generation device generates video signature as a combination of the visual feature and the confidence value and outputs the video signature.

20. The video signature generation device according to claim 1, wherein both a combination of shapes of two sub-regions in the single frame and a relative position between the two sub-regions in the single frame differs from those of at least one of other two sub-regions in the single frame.

21. The video signature generation device according to claim 1, wherein absolute positions of the two sub-regions in the single frame differ from absolute positions of other pairs of sub-regions in the single frame in which both a combination of shapes of the two sub-regions and the other pairs of sub-regions and a relative position between the two sub-regions and the other pairs of sub-regions are same.

22. A video signature matching device that compares (i) a first visual feature of a first video calculated from features of two first sub-regions in a first single frame in the first video to (ii) a second visual feature of a second video calculated from features of two second sub-regions in a second single frame in the second video, and determines a reliability of a result of determining whether the first video is a substantial duplicate of a second video using the features of the two first sub-regions and the two second sub-regions based on the first confidence value information calculated from the features of the two first sub-regions that indicates a first reliability of the first visual feature and second confidence value information calculated from the features of the two second sub-regions that indicates a second reliability of the second visual feature, the device comprising:
a processor that controls the video signature matching device to implement:
a matching parameter calculation unit which calculates a matching parameter based on the first confidence value information and the second confidence value information; and
a matching unit which compares the first visual feature with the second visual feature in accordance with the matching parameter, and generates a matching result that indicates whether the first video is the substantial duplicate of the second video.

23. The video signature matching device according to claim 22, wherein first confidence value information is calculated based on a first difference between the two first sub-regions in the first single frame in the first video, and the second confidence value information is calculated based on a second difference between the two second sub-regions in the second single frame in the second video.

24. The video signature matching device according to claim 22, wherein the first confidence value information is calculated based on a first absolute difference between the two first sub-regions in the first single frame in the first video, and the second confidence value information is calculated based on a second absolute difference between the two second sub-regions in the second single frame in the second video.

25. The video signature matching device according to claim 22, wherein the matching parameter calculation unit outputs a specific matching parameter as the matching parameter to indicate that the first video is not the substantial duplicate of the second video if one of the first confidence value information and the second confidence value information is smaller than a predetermined threshold, and
if the matching parameter is the specific matching parameter, the matching unit outputs that the first video is not substantial duplicate of the second video as the matching result.

26. The video signature matching device according to claim 22, wherein the matching parameter calculation unit outputs a specific matching parameter as the matching parameter to indicate that the first video is not the substantial duplicate of the second video if both the first confidence value information and the second confidence value information are smaller than a predetermined threshold, and
if the matching parameter is the specific matching parameter, the matching unit outputs that the first video is not the substantial duplicate of the second video as the matching result.

27. A matching device comprising:
a processor that controls the matching device to implement:
a matching parameter calculating unit that receives a first confidence value calculated from differences between features of two first sub-frames in a first video of a first input signal, the first input signal comprising a first video signature that comprises the first confidence value and a first visual feature of the first video calculated from the features of the two first sub-frames, receives a second confidence value calculated from differences between features of two second sub-frames in a second video of a second input signal, the second input signal comprising a second video signature that comprises the second confidence value and a second visual feature of the second video calculated from the features of the two second sub-frames, and calculates a matching parameter based on the first confidence value and the second confidence value; and
a matching unit that receives the first visual feature, the second visual feature, and the matching parameter, and determines whether the first video is a substantial duplicate of the second video based on the first visual feature, the second visual feature, and the matching parameter.

28. A video signature generation method for identifying duplicate video content comprising:
extracting a visual feature of a video based on features of two sub-regions in a single frame in the video; and
calculating a confidence value of the visual feature based on the features of the two sub-regions in the single frame, wherein the calculating comprises calculating the confidence value based on a difference between the two sub-regions in the single frame.

29. The video signature generation method according to claim 28, wherein the confidence value indicates a reliability of a result of determining whether the video is a substantial duplicate of another video based on the visual feature.

30. The video signature generation method according to claim 29, wherein the confidence value is low when the reliability of the result is low and the confidence value is high when the reliability of the result is high.

31. The video signature generation method according to claim 28, wherein the confidence value is low when a pattern of the video is a predetermined pattern.

32. The video signature generation method, according to claim 31, wherein the predetermined pattern is a flat image.

33. The video signature generation method, according to claim 31, wherein the predetermined pattern is an image pattern where there is little or no difference between the features of the two sub-regions.

34. A video signature matching method comprising:
calculating a matching parameter based on the-first confidence value information and second confidence value information, the first confidence value information calculated from differences between features of two first sub-regions of a first single frame of a first video the first confidence value information indicating a first reliability of a first visual feature of the first video calculated from the features of the two first sub-frames, the second confidence value information calculated from differences between features of two second sub-regions of a second single frame of a second video, the second confidence value information indicating a second reliability of the second visual feature of the second video calculated from the features of the two second sub-frames: and
comparing the first visual feature with the second visual feature in accordance with the matching parameter; and
generating a matching result that indicates whether the first video is the substantial duplicate of the second video based on a result of the comparing.

35. The video signature matching method according to claim 34, wherein the first confidence value information is calculated based on a first difference between the two first sub-regions in the single first frame in the first video, and the second confidence value info ation is calculated based on a second difference between the two second sub-regions in the second single frame in the second video.

36. The video signature matching method according to claim 34, wherein the first confidence value information is calculated based on a first absolute difference between the two first sub-regions in the single first frame in the first video, and the second confidence value information is calcula ed based on a second absolute difference between the two second sub-regions in the second single frame in the second video.

37. The video signature matching method according to claim 34, wherein the calculating comprises if one of the first confidence value information and the second confidence value information is smaller than a predetermined threshold, a specific matching parameter is calculated as the matching parameter to indicate that the first video is not the substantial duplicate of the second video, and
wherein the gene ating comprises if the matching parameter is the specific matching parameter, generating a result that the first video is not the substantial duplicate of the second video as the matching result.

38. The video signature matching method according to claim 34, wherein the calculating comprises if both the first confidence value information and the second confidence value information are smaller than a predetermined threshold, a specific matching parameter is calculated as the matching parameter to indicate that the first video is not the substantia duplicate of the second video, and
wherein the generatin comprises if the matching parameter is the specific matching parameter, generating a result that the first video is not the substantialduplicate of the second video as the matching result.

39. A matching method comprising:
receiving a first confidence value calculated from differences between features of two first sub-frames in a first video of a first inpu signal. the first input signal comprising a first video signature that comprises the first confidence value and a first visual feature of the first video calculated from the features of the two first sub-frames;
receiving a second confidence value calculated from differences between features of two second sub-frames in a second video of a second input signal, the second input signal comprising a second video signature that comprises the second confidence value and a second visual feature of the second video calculated from the features of the hwo second sub-frames;
calculating a matching parameter based on the first confidence value and the second confidence value; and
obtaining the first visual feature, the second visual feature, and the matching parameter, and determining whether the first video is a substantial duplicate of the second video based on the first visual feature, the second visual feature, and the matching parameter.

40. A non-transitory computer-readable medium having embodied thereon computer implementable instructions that cause a computer to function as a video signature generation device for identifying duplicate video content, comprising:
a visual feature extraction unit which extracts a visual feature of a video based on features of two sub-regions in a single frame in the video; and
a confidence value calculation unit which calculates a confidence value of the visual feature based on the features of the two sub-regions in the single frame, wherein the confidence value calculation unit calculates the confidence value based on a difference between the sub-regions in the single frame.

41. A non-transitory computer-readable medium having embodied thereon computer implementable instructions that cause a computer to function as:
a matching parameter calculation unit which receives first confidence value information calculated from differences between features of two first sub-frames in a first video of a first input signal, the first input signal comprising a first video signature that comprises the first confidence value and a first visual feature of the first video calculated from the features of the two first sub-frames, and second confidence value information calculated from differences between features of two second sub-frames in a second video of a second input signal, the second input signal comprising a second video signature that comprises the second confidence value and a second visual feature of the second video calculated from the features of the two second sub-frames, and calculates a matching parameter based on the first confidence value and the second confidence value; and
a matching unit receives the first visual feature, the second visual feature, and the matching parameter, and determines whether the first video is a substantial duplicate of the second video based on the first visual feature, the second visual feature. and the matching parameter.

* * * * *